United States Patent [19]

Roseman

[11] 4,343,820

[45] Aug. 10, 1982

[54] FREE-FLOWING, SWEETENED, HYDRATED, COCONUT PARTICLES AND METHOD FOR PREPARING SAME

[75] Inventor: Arnold S. Roseman, Glen Ellyn, Ill.

[73] Assignee: CFS Continental, Inc., Chicago, Ill.

[21] Appl. No.: 299,305

[22] Filed: Sep. 4, 1981

[51] Int. Cl.³ .............................................. A23L 1/36
[52] U.S. Cl. .................................. 426/103; 426/617;
426/639; 426/289; 426/653
[58] Field of Search ............... 426/617, 102, 103, 639,
426/640, 442, 653, 289, 294, 295

[56] References Cited

U.S. PATENT DOCUMENTS

| | | | |
|---|---|---|---|
| 1,033,860 | 7/1912 | Barnes | 426/617 |
| 1,060,912 | 5/1913 | Lasby | 426/617 |
| 2,272,989 | 2/1942 | Forkner et al. | 426/617 |
| 3,655,409 | 4/1972 | Glasser et al. | 426/617 |
| 3,860,725 | 1/1975 | Forkner | 426/617 |
| 3,899,606 | 8/1975 | Forkner | 426/617 |
| 4,296,136 | 10/1981 | Ziccarelli et al. | 426/617 |

*Primary Examiner*—Jeanette M. Hunter
*Attorney, Agent, or Firm*—Dressler, Goldsmith, Shore, Sutker & Milnamow, Ltd.

[57] ABSTRACT

A free-flowing, sweetened, hydrated coconut product containing desiccated coconut, water, sweetener solids and a surface coating of powdered cellulose, and its method of manufacture are disclosed.

25 Claims, No Drawings

FREE-FLOWING, SWEETENED, HYDRATED, COCONUT PARTICLES AND METHOD FOR PREPARING SAME

DESCRIPTION

1. Technical Field

This invention relates to sweetened, hydrated coconut particles, and particularly to such particles which are free-flowing and do not tend to clump or agglomerate after preparation.

2. Background Art

Desiccated coconut particles are an item of commerce which typically contain about 2 to about 5 percent by weight water. After admixture with additional quantities of water, sweeteners, humectants, and other flavorants, sweetened, hydrated, particulate coconut products are formed. These latter products are well known as toppings in bakery arts and for their use in other comestible products.

While sweetened, hydrated, particulate coconut products have been items of commerce for many years, a major problem is still associated with their manufacture.

The typical method of manufacture usually requires about one hour or more to complete. Other processes may require that direct application of heat. For example, is one common procedure, the hydration water is heated to a temperature of about 125° F. prior to the hydration step. After admixture of the heated water and desiccated coconut, the admixture is tempered at an elevated temperature for several hours, and is finally cooled for packaging. If the tempering step is omitted, a sticky, gummy product with poor handling characteristics is said to result. Even with the tempering step, the product particles usually tend to agglomerate.

A process of preparing sweetened, hydrated particulate coconut products has been published by J. G. Woodruff in *Coconuts: Production Processing Products*, The Avi Publishing Company, Inc., Westport, Conn., 1978, at pages 115 through 116, wherein sugar is dissolved in water and the solution thereafter heated to about 180° F. This hot solution is poured onto the desiccated coconut and mixed therewith for two to three minutes, after which time mixing is stopped and the product allowed to soak for 15 to about 40 minutes. This process, however, also often leads to a product whose individual particles tend to agglomerate.

Thus, there has been a long-standing need for a hydrated sweetened particulate coconut product whose individual particles do not tend to agglomerate, thereby facilitating their subsequent use in commerce. Advances in the method of manufacture of a sweetened, hydrated, particulate coconut product which shortens its time of preparation also would be desirable.

SUMMARY OF THE INVENTION

According to the present invention, a free-flowing, sweetened, hydrated, coconut particle product is prepared in an expeditious manner. This product is prepared by admixing water and a sweetener with agitation to desiccated coconut particles to form sweetened, hydrated, coconut particles. Powdered cellulose is then added with agitation to the sweetened, hydrated coconut admixture to prepare the sweetened, hydrated coconut product that is particulate and free-flowing.

The product of this invention contains about 35 to about 75 parts by weight desiccated coconut particles (moisture-free basis), about 8 to about 20 parts by weight total water, about 15 to about 45 parts by weight sweetener solids and sufficient powdered cellulose, usually about 0.5 to about 5 parts by weight, to permit free flow of the particulate product. The powdered cellulose is on the outside surfaces of the sweetened coconut particles.

The present invention has several benefits and advantages. One advantage of this invention is that its products are free-flowing and do not tend to agglomerate after their production. This feature allows easier product use and metering, and thereby provides a saving in time and money.

This invention also offers a benefit to the manufacturer in that its process of manufacture can be less time consuming than the before-described preparations in that neither tempering nor soaking steps are needed, nor are the relatively high temperature and attendant energy consumption of the before-described process required.

Several other benefits and advantages of the instant invention will be apparent to those skilled in the art upon reference to the ensuing specification and claims.

DETAILED DESCRIPTION OF THE INVENTION

The products of this invention are free-flowing, sweetened, hydrated, coconut particles which are believed to obtain their unique free-flowing character from the coating of powdered cellulose on the outside of the particle surfaces and from the novel method of the product's manufacture. It is to be emphasized that traditional, edible anti-caking agents such as sodium silicoaluminate and hydrated amorphous silica are not effective in preparing the free-flowing products of this invention, and that no substitutes for the powdered cellulose coating, discussed hereinbelow, have been found.

The powdered cellulose useful herein can be prepared by several means and can be fibrous or non-fibrous. However, regardless of its method of preparation, powdered cellulose suitable for the present invention is free-flowing and is sized so that less than about 5 weight percent of the particles are retained on a 35 Tyler mesh sieve screen and about 25 to about 90 weight percent by weight of the particles will pass through a 200 mesh sieve screen (Tyler). These cellulose particles preferably have an average length of about 20 to about 150 microns.

One particularly preferred powdered cellulose useful herein is prepared by mechanical disintegration of bleached wood or cotton pulp. This fibrous material is available in several grade designations which differ primarily in particle size, and density. Commercially available cellulose powders of this type typically contain at least about 97 weight percent pure cellulose and lose less than about 7 percent of their weight on drying. These cellulose powders also contain impurities whose typical maximal amounts are: arsenic, about 1 p.p.m.; heavy metal, about 0.001 percent; and water solubles, about 1.5 percent; all percentages being by weight. Some typical test specification ranges from one manufacturer for these preferred cellulose powders are listed below.

| Designation | Specification Ranges |
| --- | --- |
| Average fiber length (Microns) | 30–140 |
| Screen analysis (Tyler) | |
| wt. % + 35 mesh* | 0–3 |
| wt. % − 100 mesh* | 60–99 |
| wt. % − 200 mesh* | 25–90 |
| Apparent density range (g/cc)** | 0.10–0.56 |
| Ash (USP), percent | 0.3–0.4 |

*The symbol "+" designates retention on the sieve while the symbol "−" designates passage through the screen.
**The units "g/cc" indicate grams per cubic centimeter.

Another preferred cellulose powder is a non-fibrous, depolymerized alpha-cellulose. This material is available in different grades which range in average particle size from 20 to 100 microns.

One preferred grade of this cellulose powder has an average particle size of 50 microns, contains about 5 weight percent or less water at the time of shipment. About 1 weight percent or less of the cellulose powder will be retained on a 60 mesh sieve screen and about 30 weight percent or less will be retained on a 200 mesh sieve screen.

The powdered cellulose is preferably present in an amount which gives a free-flowing characteristic to the product mass. Smaller amounts of desiccated coconut particles, water and/or sweetener solids require lesser amounts of cellulose powder to obtain the desired, free-flowing characteristic to the mass. It is generally preferred that powdered cellulose be present at about 0.5 to about 5 parts by weight and more preferably at about 1 to about 4 parts by weight. The powdered cellulose (as is) is preferably admixed in an amount of about 1.5 to about 8 weight percent of the weight (as is) of the desiccated coconut, and more preferably at about 2.5 to about 7 percent by weight of the more preferred amount of desiccated coconut (see below).

Because the powdered cellulose is added to the product of this invention after the other ingredients have been added, as is discussed hereinafter, and because of the almost complete water-insolubility of the useful cellulose powders, it is believed that the cellulose powder particles are almost exclusively on the outside of the product particles, rather than being in the interior of the particles.

The products of this invention contain comminuted coconut meat particles, which have been dried to a water content of approximately 2 to about 5 percent by weight. These dried coconut particles are termed desiccated coconut in the industry, and will be so referred to herein. Desiccated coconut particles can be used in the form of flakes, long string-like threads or any other convenient, particulate form, as is well known in the industry. The smallest dimension of these particles is typically about 1/64 inch, while the largest dimension can be several inches, as in the case of the string-like threads.

The desiccated coconut, on a moisture-free basis, preferably comprises about 35 to about 75 parts by weight of the product. More preferably, desiccated coconut comprises about 40 to about 60 parts by weight of the product.

It is noted that the above amounts, expressed as parts by weight do not include the amount of water normally included in commercially available desiccated coconut, i.e., about 2–5 weight percent. It is also noted that although the coconut is hydrated during the manufacture of the product, the amount of coconut in the product is defined herein on a moisture-free basis. The as-is, pre-hydrated, desiccated coconut is meant when ratios of other ingredients to coconut are discussed relating to the method of this invention. The amount of total water in the associated coconut can be determined using Method 27.005 of *The Official Methods of Analysis Of the Association Of Official Analytical Chemists*, 12th ed., 1975.

Water is added to the desiccated coconut particles in the process of this invention and is also present in the various ingredients of the final product, as is discussed hereinbefore and hereinafter. The amount of total water in the product, i.e., water admixed plus that present in the ingredients, is preferably about 8 to about 20 parts by weight of the finished product, and the finished product more preferably contains about 10 to about 17 parts by weight total water.

Water is preferably admixed in an amount of about 10 to about 50 percent of the weight of desiccated coconut, on an as-is basis, and more preferably at about 15 to about 35 percent of the weight of the more preferred amount of desiccated coconut. Water assists in softening the comminuted particles and the particular amount of water in a given product is a matter of choice, usually depending upon the form of the coconut sweetened and whether the intended use is industrial or for sale to ultimate consumers.

A sweetener or sweetener solids preferably comprise about 15 to about 45 parts by weight of the product of this invention, and more preferably about 20 to about 40 parts by weight. The sweetener is preferably admixed in an amount of about 20 to about 120 weight percent of the desiccated coconut's weight, and more preferably in an amount of about 30 to about 100 weight percent based upon the more preferred, as is, weight of desiccated coconut.

As many sweeteners, such as corn syrup or molasses, are used as aqueous solutions, the amount of sweetener utilized in the compositions of this invention can be given in terms of the solids content of the sweetener; i.e. sweetener solids. Several types of sweeteners or sweetener solids are useful herein.

Typical, useful sweeteners include, but are not limited to glucose, fructose, sucrose, invert sugar, maltose, lactose, corn syrup, molasses, maple syrup, sorghum syrup and the so-called high fructose corn syrup. Individual sweeteners can be used, or mixtures of two or more sweeteners can be utilized. Sucrose and corn syrup are particularly preferred.

When aqueous liquid sweeteners, such as corn syrup, are utilized, the water present is calculated into the amount of total water in the product, and is included in the amount of water which is otherwise admixed with the other ingredients to form the sweetened, hydrated coconut particles. In addition, the stated amounts of sweetener solids include amounts of ingredients other than sweetener and water which are found in commercially available products. For example, powdered sugar (sucrose) typically contains up to about 3 percent starch, and that amount of starch is included in the amount of "sweetener solids" in the product.

Powdered sugar (sucrose) is a well known commodity in the food industry and a particularly preferred form of sucrose for use herein. Typical powdered sugars useful herein are those denominated 6× and 10×.

When powdered sugar is used, it is preferably admixed with the other ingredients as a solid, after water is added to hydrate the desiccated coconut particles. Granulated sucrose is preferably used after dissolution in the hydrating water, and is thus admixed with the desiccated coconut particles during the hydration step.

While not wishing to be bound by a particular theory or hypothesis, it is believed that substantially all of the water, and polyol and salt, when used, are retained inside of the particulate coconut product. On the other hand, it is believed that substantially all of the powdered sugar is retained on the outside of the comminuted coconut product as is the powdered cellulose.

It is seen that the products of this invention can preferably contain powdered cellulose, desiccated coconut (moisture-free basis), total water and sweetener solids in parts by weight ratios of about 0.5–5:35–75:8–20:15–45, in the order listed. In more preferred embodiments, the parts by weight ratios of the above ingredients is about 1–4:40–60:10–17:20–40, in the order listed above. Additionally, one or more of the more preferred amounts of ingredients can be used with preferred amounts of other ingredients.

It is noted again that when more water is used, the product also should contain relatively more of the powdered cellulose so that a free-flowing product is obtained. It is therefore preferred that the ratio of the total water present to the powdered cellulose, on an as-is basis, be about 16:1 to about 4:1, and more preferably about 10:1 to about 4:1. It is also noted that when the above four ingredients comprise substantially all of the weight of the product, e.g. 90 percent or more, the amounts given in parts by weight are approximately equal to the percentage of each ingredient in the product.

Sodium chloride (salt) is also usually present in the final product as a flavorant. The salt is preferably present at about 0.1 to about 3.5 parts by weight of the product, and more preferably at about 0.25 to about 1 parts by weight. Calculated as a function of the desiccated coconut, as is, salt is preferably admixed in an amount of about 0.3 to about 5 weight percent, and more preferably in an amount of about 0.6 to about 2.5 weight percent, based upon the more preferred range of desiccated coconut. The salt can be added to the product as an aqueous solution during the above-described addition of water. Salt can also be added as a solid, directly to the coconut particles.

Edible polyols containing 3 to about 6 carbon atoms can serve as humectants and preservatives in the products of this invention. Examples of useful, edible $C_3$–$C_6$ polyols include propylene glycol, glycerol and sorbitol. The polyols can be used alone or mixed with each other, and are preferably added to the coconut particles with the water as a solution therewith.

The edible polyols are preferably present at about 1 to about 4 parts by weight of the product, and more preferably at about 1.5 to about 3.5 parts by weight. The edible polyols are preferably added in an amount of about 1 to 10 percent of the weight of desiccated coconut, and more preferably in an amount of about 2.5 to about 9 weight percent.

It is preferred that larger amounts of either or both salt and polyol be used for products containing relatively large amounts of total water than for products containing relatively small amounts of total water.

Additional ingredients such as colorants, additional preservatives and flavorants can also be included in the products of this invention. These materials can be added to the product by their addition to the water, they can be mixed with the other previously discussed product components, e.g. sugar, and then added, or they can be added separately.

The products of this invention are preferably prepared by first providing the desiccated coconut particles and placing them into a suitable mixing apparatus. If the desiccated coconut particles are supplied as aggregated smaller particles, the aggregates are broken up to provide particles of about the size ultimately desired in the product.

To prepare the aqueous solution, water at a temperature of about 70° F. to about 140° F. is placed into a separate container. More preferably, the water temperature is about 90° F. to about 125° F. If salt, granulated sucrose, aqueous liquid sweetener and/or an edible polyol are utilized, they are preferably added to and dissolved in the water at this time to form a substantially homogenous, clear aqueous solution.

The warm aqueous solution (water alone or water plus salt, sweetener and/or polyol) is then admixed with the particulate, desiccated coconut to hydrate the coconut particles. The water can be applied with a spray attachment to the mixer or by means of a hose or the like, and is preferably applied substantially evenly over and onto the particulate, desiccated coconut. The admixture is agitated slowly during the admixing process to help assure a substantially uniform admixture of water and desiccated coconut particles. It is noted that a minimal amount of mixing and agitation is desirable throughout the process of this invention so as to avoid substantial diminution of the particle size of the particulate desiccated coconut, and crushing of the coconut particles. The admixture is typically agitated for about 1 minute to about 10 minutes after addition of the aqueous solution, depending upon the equipment used and amount of product desired.

Although it is possible to interrupt the process of this invention after the above formation of hydrated coconut particles, it is preferred to add solid sweeteners, when used, such as powdered sugar, as quickly as possible after completion of the above-described hydration step to form sweetened, hydrated coconut particles. The particularly preferred powdered sugar is somewhat lumpy as typically supplied and is consequently preferably sifted to break up the lumps, by means such as a vibratory screen. After all of the exemplary powdered sugar has been added, the resulting admixture is again mixed for about 1 minute to about 10 minutes to help assure that the sweetened, hydrated coconut particles are substantially homogeneous. The amount of mixing is again dependent upon the equipment used and the amount of product prepared.

The powdered cellulose is added to the sweetened, hydrated coconut particles after their preparation. Admixture of powdered cellulose can be carried about in a single addition or incrementally, in two or more additions. A single admixture of the powdered cellulose is preferred.

When the powdered cellulose is admixed in at least two steps, about one-third to about two-thirds of the total weight of powdered cellulose is preferably admixed in the first addition, followed by a brief mixing, e.g. for less than about one minute. The remaining two-thirds to one-third of the total weight of powdered cellulose is thereafter admixed with mixing in one or a plurality of admixing steps. When two cellulose powder additions are utilized, a waiting period of about 5 to about 15 minutes is preferred between additions. The final mixing continues for a sufficient time period after the last of the cellulose powder has been added to provide a free-flowing, sweetened, hydrated coconut particle product which is substantially homogeneous.

A particular advantage of the process of this invention is that it can be completed within about 10 to about 15 minutes from the time the salt and polyol are dissolved in the water, and yet can be interrupted after it has begun without diminution of product quality.

The preparation of three typical products produced by the process of this invention is illustrated in the Examples hereinbelow.

Free-flowing, Hydrated, Sweetened Coconut Particle Products

EXAMPLE 1

| Ingredients | Percent by Weight Product A | Product B |
|---|---|---|
| 1. Desiccated coconut flake | 43 | 50 |
| 2. Water | 12 | 10 |
| 3. Sodium chloride (salt) | 1 | 1 |
| 4. Propylene glycol (USP) | 2.5 | 2 |
| 5. Powdered sugar | 39 | 35 |
| 6. Powdered cellulose* | 2.5 | 2 |
| | 100.0 | 100.0 |

*The powdered cellulose utilized in this Example conformed to the following specifications: average fiber length (microns) 100–140; retained on 35 mesh sieve screen (Tyler) 0–3 percent, passed through 100 mesh sieve screen (Tyler) 60–75 percent, passed through 200 mesh sieve screen (Tyler) 25–40 percent; apparent density range 0.10–0.17 g/cc; ash (USP) 0.3–0.4 percent.

Products A and B were prepared identically. Ingredient 1, after separation into substantially individual particles, was placed into a mixing apparatus equipped with a spray apparatus. Water (ingredient 2) at a temperature of 90° F. to 125° F. was placed into a tank and ingredient 3 dissolved therein. Ingredient 4 was added to the saline solution so prepared, and the admixture thoroughly mixed to provide a warm, water-clear aqeuous solution.

The warm aqueous solution was then sprayed onto the particulate desiccated coconut in the mixer. The coconut was caused to rotate so that the warm solution was applied substantially uniformly onto the particles. The desiccated coconut particle-aqueous solution admixture was then agitated slowly for several minutes after all of the aqueous solution had been added to assist in obtaining substantially uniform hydration.

The powdered sugar (ingredient 5) was added to the hydrated coconut particles after the completion of the above one minute mixing period. Admixture of the powdered sugar was assisted by use of a vibratory screen having about 2–4 apertures per square inch. The resulting admixture was agitated for about one minute after all of the powdered sugar had been added to form an admixture of sweetened, hydrated coconut particles which were substantially homogenous.

About one-half of the total cellulose power (about 1 weight percent of the product) was added substantially evenly across the sweetened, hydrated coconut admixture upon cessation of the above one minute mixing step, and the resulting admixture was mixed again briefly. The remainder of the cellulose powder was then added with mixing. The mixing was stopped about one minute after all of the cellulose powder has been added to thereby provide free-flowing, sweetened, hydrated coconut particles which were substantially homogenous.

Free-flowing, Hydrated, Sweetened Coconut Particle Product Containing Granulated Sugar

EXAMPLE 2

Another product of this invention was prepared in which the sweetener was comprised of both granulated and powdered sugars (sucrose). The ingredients of this product and the percentages of each ingredient are listed below.

| Ingredients | Percent by Weight |
|---|---|
| 1. Desiccated coconut flake | 43 |
| 2. Water | 12 |
| 3. Sodium chloride (salt) | 1 |
| 4. Propylene glycol | 2.5 |
| 5. Powdered sugar | 29 |
| 6. Powdered cellulose* | 2.5 |
| 7. Granulated sugar | 10 |
| | 100.0 |

*See Example 1.

This free-flowing, hydrated coconut particle product was prepared in a manner substantially indentical to that for the product of Example 1, except that the granulated sugar was dissolved in the water-salt propylene glycol solution and added to the desiccated coconut along with those ingredients, and the cellulose powder was added in one addition step.

The present invention has been described generally and with respect to preferred embodiments. It will be clear to those skilled in the art that modifications and/or variations of the disclosed free-flowing product and its process of manufacture can be made without departing from the scope of the invention set forth herein. The invention is defined by the claims which follow.

What is claimed is:

1. A method of preparing free-flowing, sweetened, hydrated, coconut particle product comprising the steps of:
    providing desiccated coconut particles;
    providing water;
    providing a sweetener;
    admixing said water and said sweetener with said coconut particles and agitating the admixture to combine said water, sweetener and coconut particles to form sweetened, hydrated coconut particles; and
    admixing powdered cellulose with said sweetened, hydrated, particulate coconut admixture with agitation in an amount to produce said free-flowing, sweetened, hydrated, coconut particle product.

2. The method according to claim 1 wherein said sweetener is admixed subsequent to the admixture of said aqueous solution.

3. The method according to claim 1 wherein the amount of water admixed comprises about 10 to about 50 weight percent of said desiccated coconut.

4. The method according to claim 3 wherein an edible polyol having about 3 to about 6 carbon atoms and sodium chloride are admixed with said water to form an aqueous solution, and said aqueous solution is admixed with said desiccated coconut.

5. The method according to claim 1 wherein the amount of said sweetener solids admixed comprises about 20 to about 120 weight percent of said desiccated coconut.

6. The method according to claim 1 wherein the amount of said powdered cellulose admixed comprises about 1.5 to about 8 weight percent of said desiccated coconut.

7. A method of preparing a particulate free-flowing, sweetened, hydrated, coconut product comprising the steps of:
providing desiccated coconut particles;
admixing an aqueous solution containing water, an edible polyol having about 3 to about 6 carbon atoms and sodium chloride with said coconut particles and agitating said admixture to form hydrated coconut particles, said water comprising about 10 to about 50 percent of the weight of said desiccated coconut;
admixing with agitation a sweetener at about 20 to about 120 percent of the weight of said desiccated coconut with said hydrated coconut particles and continuing the agitation for a time period sufficient to form a sweetened, hydrated, particulate coconut admixture; and
admixing and agitating cellulose powder at about 1.5 to about 8 percent of the weight of said desiccated coconut with the sweetened coconut admixture to prepare said product.

8. The method according to claim 7 wherein said aqueous solution is at a temperature of about 70° F. to about 125° F. when admixed with said desiccated coconut.

9. The method according to claim 7 wherein said aqueous solution is at a temperature of about 90° F. to about 125° F. when admixed with said desiccated coconut.

10. The method according to claim 7 wherein the amount of water added as said aqueous solution comprises about 15 to about 35 weight percent of said desiccated coconut.

11. The method according to claim 7 wherein the amount of said polyol in said aqueous solution comprises about 1 to about 10 weight percent of said desiccated coconut, and said sodium chloride in said aqueous solution comprises about 0.3 to about 5 weight percent of said desiccated coconut.

12. The method according to claim 7 wherein a portion of said sweetener is dissolved in said aqueous solution.

13. The method according to claim 7 wherein said sweetener is powdered sugar, and said powdered sugar comprises about 30 to about 100 weight percent of said desiccated coconut.

14. The method according to claim 7 wherein said powdered cellulose particles are of a size so that less than about 5 weight percent of said particles are retained on a 35 Tyler mesh sieve screen and about 25 to about 90 weight percent of said particles pass through a 200 Tyler mesh sieve screen.

15. The method according to claim 14 wherein the amount of said powdered cellulose added comprises about 2.5 to about 7 weight percent of said desiccated coconut.

16. The method according to claim 7 wherein the total amount of said powdered cellulose is admixed with the sweetened coconut admixture in at least two steps; about one third to about two thirds of the total amount of powdered cellulose admixed being added during the first of said steps.

17. A method of preparing a particulate, free-flowing, sweetened, hydrated coconut product comprising the steps of:
providing desiccated coconut particles;
admixing an aqueous solution at a temperature of about 90° F. to about 125° F. with said desiccated coconut particles and agitating said admixture for a time period sufficient to form hydrated coconut particles, said aqueous solution containing water in an amount of about 15 to about 35 weight percent, an edible polyol having about 3 to about 6 carbon atoms present at about 2.5 to about 9 weight percent, and sodium chloride present at about 0.6 to about 2.5 weight percent, said weight percentages being based upon the weight of desiccated coconut;
admixing with agitation powdered sugar in an amount of about 30 to about 100 weight percent of said desiccated coconut with said hydrated coconut particles and continuing the agitation for a time period sufficient to form a sweetened, hydrated, particulate coconut admixture; and
admixing and agitating cellulose powder particles at a total amount constituting about 2.5 to about 7 weight percent of said desiccated coconut, the produced cellulose powder-containing admixture being agitated until substantially homogenous; said cellulose powder particles having a size so that less than about 5 weight percent of said particles are retained on a 35 Tyler mesh sieve screen and about 25 to about 90 weight percent of said particles pass through a 200 Tyler mesh sieve screen.

18. A free-flowing, particulate, sweetened, hydrated coconut product comprising about 35 to about 75 parts by weight percent coconut particles, on a moisture-free basis, about 8 to about 20 parts by weight total water, about 15 to about 45 parts by weight sweetener solids, and sufficient powdered cellulose to permit free-flow of said particulate product; said powdered cellulose being on the outside surfaces of said coconut particles.

19. The coconut product of claim 18 wherein said powdered cellulose is distributed substantially evenly on the surfaces of said coconut particles.

20. The coconut product of claim 19 wherein said cellulose particles are of a size so that less than about 5 weight percent of said particles are retained on a 35 Tyler mesh sieve screen and about 25 to about 90 weight percent of said particles pass through a 200 Tyler mesh sieve screen.

21. The coconut product of claim 19 additionally containing about 1 to about 4 parts by weight of an edible polyol having about 3 to about 6 carbon atoms.

22. The coconut product of claim 18 additionally containing about 0.1 to about 3.5 parts by weight sodium chloride.

23. The coconut product of claim 18 wherein the weight ratio of said total water to said powdered cellulose is about 16:1 to about 4:1.

24. A free-flowing, particulate, sweetened, hydrated coconut product comprising about 40 to about 60 weight percent desiccated coconut particles, on a moisture-free basis, about 10 to about 17 weight percent total water, about 20 to about 40 weight percent powdered sugar, about 1.5 to about 3.5 weight percent of an edible polyol having about 3 to about 6 carbon atoms, about 0.25 to about 1 weight percent sodium chloride, and about 1 to about 4 weight percent powdered cellulose; said powdered cellulose being distributed substantially evenly on the outside surfaces of said coconut particles and said cellulose powder particles being of a size so that less than about 5 weight percent of said particles are retained on a 35 Tyler mesh sieve screen and about 25 to about 90 weight percent of said particles pass through a 200 Tyler mesh sieve screen.

25. The coconut product of claim 24 wherein the weight ratio of said total water to said powdered cellulose is about 10:1 to about 4:1.

* * * * *